United States Patent
Zhang

(10) Patent No.: US 11,616,675 B2
(45) Date of Patent: *Mar. 28, 2023

(54) METHOD AND DEVICE IN WIRELESS COMMUNICATION SYSTEM THAT SUPPORTS BROADCAST SIGNALS

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/565,481

(22) Filed: Dec. 30, 2021

(65) Prior Publication Data

US 2022/0123980 A1   Apr. 21, 2022

Related U.S. Application Data

(63) Continuation of application No. 16/285,248, filed on Feb. 26, 2019, now Pat. No. 11,265,194, which is a
(Continued)

(30) Foreign Application Priority Data

Aug. 29, 2016   (CN) .......................... 201610754332.8

(51) Int. Cl.
*H04L 27/26*    (2006.01)
*H04L 5/00*    (2006.01)
(Continued)

(52) U.S. Cl.
CPC ........ *H04L 27/2613* (2013.01); *H04L 5/0048* (2013.01); *H04L 5/0051* (2013.01);
(Continued)

(58) Field of Classification Search
CPC . H04L 27/2613; H04L 27/262; H04L 27/261; H04L 27/26132; H04L 27/26134;
(Continued)

(56) References Cited

U.S. PATENT DOCUMENTS

2004/0258420 A1   12/2004  Sayyah
2010/0272040 A1*  10/2010  Nam ....................... H04J 13/12
                                                      370/329
(Continued)

FOREIGN PATENT DOCUMENTS

CN         101330325 A      12/2008
CN         101741793 A       6/2010
(Continued)

OTHER PUBLICATIONS

CN Search Report in application No. 201610754332.8 dated Nov. 30, 2018.
(Continued)

*Primary Examiner* — Ashley Shivers

(57) ABSTRACT

A method and a device in a User Equipment (UE) and a base station used for wireless communication systems that support broadcast signals. The UE receives a first radio signal on a first time-frequency resource. The first radio signal comprises a first RS sequence, RSs in the first RS sequence are mapped from lower frequency to higher frequency in frequency domain, the first time-frequency resource belongs to a first frequency domain resource. The first frequency domain resource comprises K frequency domain sub-resource(s). (A) Position(s) of the K frequency domain sub-resource(s) in the first frequency domain resource is(are) unfixed, RSs of the first RS sequence in a given frequency domain sub-resource are not related to a position of the given frequency domain sub-resource in the first frequency domain resource. Therefore, the UE is able to correctly
(Continued)

receive RSs even without knowing the position of frequency domain resources in the system bandwidth.

20 Claims, 9 Drawing Sheets

Related U.S. Application Data continuation of application No. PCT/CN2017/094836, filed on Jul. 28, 2017.

(51) Int. Cl.
*H04W 76/11* (2018.01)
*H04W 72/04* (2009.01)
*H04W 72/0453* (2023.01)

(52) U.S. Cl.
CPC ....... *H04L 5/0094* (2013.01); *H04W 72/0453* (2013.01); *H04W 76/11* (2018.02)

(58) Field of Classification Search
CPC ............. H04L 27/26136; H04L 5/0094; H04L 5/0048; H04L 5/0051; H04W 76/11; H04W 72/0453; H04W 72/005
See application file for complete search history.

(56) References Cited

U.S. PATENT DOCUMENTS

2016/0301511 A1* 10/2016 Yoon .................... H04B 7/0413
2019/0159153 A1* 5/2019 Li .......................... H04L 27/26

FOREIGN PATENT DOCUMENTS

| CN | 101841354 A | 9/2010 |
| CN | 102769592 A | 11/2012 |
| CN | 104038320 A | 9/2014 |
| CN | 105898872 A | 8/2016 |
| EP | 2290847 A1 | 3/2011 |

OTHER PUBLICATIONS

CN First Office Action in Application No. 201610754332.8 dated Dec. 11, 2018.
CN Grant Notice in Application No. 201610754332.8 dated Feb. 12, 2019.
ISR received in application No. PCT/CN2017/094836 dated Sep. 28, 2017.
CN Search Report in application No. CN201910124498.5 dated Jul. 22, 2021.
CN First Office Action in Application No. CN201910124498.5 dated Apr. 6, 2021.
CN Grant Notice in Application No. CN201910124498.5 dated Aug. 5, 2021.

* cited by examiner

METHOD AND DEVICE IN WIRELESS COMMUNICATION SYSTEM THAT SUPPORTS BROADCAST SIGNALS

CROSS REFERENCE TO RELATED APPLICATION

This application is a continuation of the U.S. patent Ser. No. 16/285,248, filed on Feb. 26, 2019, which has the U.S. Pat. No. 11,265,194, which is a continuation of International Application No. PCT/CN2017/094836, filed Jul. 28, 2017, claiming the priority benefit of Chinese Patent Application Serial Number 201610754332.8, filed on Aug. 29, 2016, the full disclosure of which is incorporated herein by reference.

BACKGROUND

Technical Field

The present disclosure relates to methods and devices in mobile communication technical field, and in particular to wireless communication schemes and devices in systems supporting broadcast signals.

Related Art

According to discussions of 3rd Generation Partner Project (3GPP) Radio Access Network 1 (RAN1), the design of New Radio (NR) system must have sound forward compatibility. To serve this purpose, the design of NR system needs to be sufficiently flexible. But in the meanwhile, a flexible design also raises the uncertainty of the system, hence increased complexity of User Equipment (UE) processing. Given that the flexibility of the design is fully guaranteed, to streamline processing of UE to ensure normal operation of NR system becomes a research orientation.

SUMMARY

The inventor finds through researches that under a flexible system design, system information about NR system will not be transmitted on a specific frequency domain resource, so a UE needs to monitor different frequency domain resources to receive system information. In existing 3GPP Long-Term Evolution (LTE) system, positions of a Reference Signal (RS) sequence and sub-carriers occupied by RSs in the entire system bandwidth are interrelated. When monitoring different frequency domain resources, a UE finds it hard to acquire the position of the monitored frequency domain resource in the whole system bandwidth, therefore, if employing methods in existing 3GPP LTE system, the UE will not be able to acquire an RS sequence on the frequency domain resource being monitored, thus making it impossible to perform channel estimation.

In view of the above problems, the present disclosure provides a solution. It should be noted that the embodiments of the UE in the present disclosure and characteristics in the embodiments may be applied to the base station, and vice versa, if there is no conflict. And further, the embodiments of the present disclosure and the characteristics in the embodiment may be mutually combined if there is no conflict.

The present disclosure provides a method in a UE for broadcast signals, comprising:

receiving a first radio signal on a first time-frequency resource;

herein, the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource(s), K is a positive integer; (a) position(s) of the K frequency domain sub-resource(s) in the first frequency domain resource is(are) unfixed, RSs of the first RS sequence in a given frequency domain sub-resource are not related to a position of the given frequency domain sub-resource in the first frequency domain resource, the given frequency domain sub-resource is any one of the K frequency domain sub-resource(s); the K is equal to 1, an RS of the first RS sequence in a given sub-carrier is related to the given sub-carrier's position relative to the K frequency domain sub-resource, or an RS of the first RS sequence in a given sub-carrier is related to the given sub-carrier's position in the first frequency domain resource; the given sub-carrier is located within the first frequency domain resource and out of the K frequency domain sub-resource(s).

In one embodiment, the bandwidth of the K frequency domain sub-resource(s) is fixed.

In one embodiment, the K is greater than 1, the K frequency domain sub-resources have equal bandwidth.

In one embodiment, the K frequency domain sub-resources are mutually orthogonal.

In one embodiment, the first frequency domain resource occupies the entire system bandwidth.

In one embodiment, the K frequency domain sub-resource(s) is(are) narrow banded.

The above method ensures that the UE is still able to correctly receive RSs in the given frequency domain sub-resource even under the circumstance of not knowing the position of the given frequency domain sub-resource in the first frequency domain resource, and to perform channel estimation in the given frequency domain sub-resource.

In one embodiment, all RSs in the first RS sequence are transmitted by the same antenna port.

In one embodiment, patterns of the first RS sequence in all time-frequency resource blocks in the first time-frequency resource are the same.

In one embodiment, the time-frequency resource blocks are Physical Resource Block Pairs (PRBPs).

In one embodiment, each of the time-frequency resource blocks occupies a positive integer number of sub-carriers in frequency domain, and occupy a positive integer number of multi-carrier symbols.

In one embodiment, the multi-carrier symbols are Orthogonal Frequency Division Multiplexing (OFDM) symbols.

In one embodiment, the multi-carrier symbols are Filter Bank Multi Carrier (FBMC) symbols.

In one embodiment, the multi-carrier symbols are Discrete Fourier Transform Spread OFDM (DFT-S-OFDM) symbols.

In one embodiment, patterns of the first RS sequence in time-frequency resource blocks are patterns of Channel State Information-Reference Signal (CSI-RS) in time-frequency resource blocks.

In one embodiment, patterns of the first RS sequence in time-frequency resource blocks are patterns of Demodulation Reference Signals (DMRS) in time-frequency resource blocks.

In one embodiment, all RSs in the first RS sequence are transmitted on one same physical layer channel.

Specifically, according to one aspect of the present disclosure, comprising:

determining a first reference sequence;

herein the K is 1, the RS of the first RS sequence in the given sub-carrier is related to the given sub-carrier's position relative to the K frequency domain sub-resource, the first reference sequence is used for generating the first RS sequence, the first reference sequence has a same length as the first RS sequence; the first RS sequence is generated from the first reference sequence being cyclically shifted by t1 element(s), t1 is a positive integer;

In one embodiment, the t1 is related to the position of the K frequency domain sub-resource in the first frequency domain resource.

In one embodiment, the first RS sequence is generated from the first reference sequence being cyclically shifted by t1 element(s) to the right, the t1 is an index of a target RS in the first RS sequence, the target RS is an RS corresponding to lowest frequency in RSs of the first RS sequence transmitted on the K frequency domain sub-resource.

In one embodiment, the first RS sequence is generated from the first reference sequence being cyclically shifted by t1 element(s) to the right, the t1 is an index of a target RS in the first RS sequence, the target RS is an RS corresponding to highest frequency in RSs of the first RS sequence transmitted on the K frequency domain sub-resource.

In one embodiment, the first reference sequence is a pseudo random sequence. In one subembodiment, the pseudo random sequence is a part of a Gold sequence.

In one embodiment, an identifier of a serving cell of the UE is used for determining the first reference sequence. In one subembodiment, the identifier of the serving cell is a Cell-Radio Network Temporary Identifier (C-RNTI).

In one embodiment, the first reference sequence is cell-specific.

The above method ensures that the UE, after acquiring the position(s) of the K frequency domain sub-resource(s) in the first frequency domain resource, will be able to infer the first RS sequence to perform channel estimation on the first frequency domain resource.

Specifically, according to one aspect of the present disclosure, comprising:

determining a second reference sequence;

herein an RS of the second reference sequence in the given sub-carrier is related to the given sub-carrier's position in the first frequency domain resource; the second reference sequence is used for generating the first RS sequence; the second reference sequence has a same length as the first RS sequence; RSs of the first RS sequence transmitted out of the K frequency domain sub-resource(s) are corresponding elements in the second reference sequence.

In one embodiment, the second reference sequence is a pseudo random sequence. In one subembodiment, the pseudo random sequence is a part of a Gold sequence.

In one embodiment, an identifier of a serving cell of the UE is used for determining the second reference sequence. In one subembodiment, the identifier of the serving cell is a C-RNTI.

In one embodiment, the second reference sequence is cell-specific.

The above method ensures that the UE, after acquiring the position(s) of the K frequency domain sub-resource(s) in the first frequency domain resource, will be able to infer the first RS sequence to perform channel estimation on the first frequency domain resource.

Specifically, according to one aspect of the present disclosure, comprising:

determining a third reference sequence;

herein elements in the third reference sequence and RSs of the first RS sequence transmitted in the K frequency domain sub-resource(s) have a one-to-one correspondence relationship.

In one embodiment, the third reference sequence is a pseudo random sequence. In one subembodiment, the pseudo random sequence is a part of a Gold sequence.

In one embodiment, an identifier of a serving cell of the UE is used for determining the third reference sequence. In one subembodiment, the identifier of the serving cell is a C-RNTI.

In one embodiment, the third reference sequence is cell-specific.

In one embodiment, the third reference sequence has a same length as RSs of the first RS sequence transmitted in the K frequency domain sub-resource(s).

Specifically, according to one aspect of the present disclosure, comprising:

receiving downlink information;

herein the downlink information is used for determining the first frequency domain resource.

Specifically, according to one aspect of the present disclosure, comprising:

receiving downlink information;

herein the downlink information is used for determining the position(s) of the K frequency domain sub-resource(s) in the first frequency domain resource.

Specifically, according to one aspect of the present disclosure, comprising:

receiving downlink information;

herein the downlink information is used for determining the first frequency domain resource and the position(s) of the K frequency domain sub-resource(s) in the first frequency domain resource.

In one embodiment, the downlink information is System Information Block (SIB).

In one embodiment, the downlink information is carried by a higher-layer signaling.

In one embodiment, the downlink information is broadcast information.

The present disclosure provides a method in a base station device for broadcast signals, comprising:

transmitting a first radio signal on a first time-frequency resource;

herein the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource(s), K is a positive integer; (a) position(s) of the K frequency domain sub-resource(s) in the first frequency domain resource is(are) unfixed, RSs of the first RS sequence in a given frequency domain sub-resource are not related to a position of the given frequency domain sub-resource in the first frequency domain resource, the given frequency domain sub-resource is any one of the K frequency domain sub-resource(s); the K is equal to 1, an RS of the first RS sequence in a given sub-carrier is related to the given sub-carrier's position relative to the K frequency domain sub-resource, or an RS of the first RS sequence in a given sub-carrier is related to the given sub-carrier's position in the first frequency domain resource; the given sub-carrier is located within the first frequency domain resource and out of the K frequency domain sub-resource(s).

In one embodiment, the bandwidth of the K frequency domain sub-resource(s) is fixed.

In one embodiment, the K is greater than 1, the K frequency domain sub-resources have equal bandwidth.

In one embodiment, the K frequency domain sub-resources are mutually orthogonal.

In one embodiment, the first frequency domain resource occupies the entire system bandwidth.

In one embodiment, the K frequency domain sub-resource(s) is(are) narrow banded.

Specifically, according to one aspect of the present disclosure, comprising:
determining a first reference sequence;
herein the K is 1, the RS of the first RS sequence in the given sub-carrier is related to the given sub-carrier's position relative to the K frequency domain sub-resource, the first reference sequence is used for generating the first RS sequence, the first reference sequence has a same length as the first RS sequence, the first RS sequence is generated from the first reference sequence being cyclically shifted by t1 element(s), t1 is a positive integer;

In one embodiment, the first RS sequence is generated from the first reference sequence being cyclically shifted by t1 element(s) to the right, the t1 is an index of a target RS in the first RS sequence, the target RS is an RS corresponding to lowest frequency in RSs of the first RS sequence transmitted on the K frequency domain sub-resource.

In one embodiment, the first RS sequence is generated from the first reference sequence being cyclically shifted by t1 element(s) to the right, the t1 is an index of a target RS in the first RS sequence, the target RS is an RS corresponding to highest frequency in RSs of the first RS sequence transmitted on the K frequency domain sub-resource.

In one embodiment, the first reference sequence is a pseudo random sequence. In one subembodiment, the pseudo random sequence is a part of a Gold sequence.

In one embodiment, an identifier of a serving cell of the UE is used for determining the first reference sequence. In one subembodiment, the identifier of the serving cell is a Cell-Radio Network Temporary Identifier (C-RNTI).

In one embodiment, the first reference sequence is cell-specific.

Specifically, according to one aspect of the present disclosure, comprising:
determining a second reference sequence;
herein an RS of the second reference sequence in the given sub-carrier is related to the given sub-carrier's position in the first frequency domain resource; the second reference sequence is used for generating the first RS sequence; the second reference sequence has a same length as the first RS sequence; RSs of the first RS sequence transmitted out of the K frequency domain sub-resource(s) are corresponding elements in the second reference sequence.

In one embodiment, the second reference sequence is a pseudo random sequence. In one subembodiment, the pseudo random sequence is a part of a Gold sequence.

In one embodiment, an identifier of a serving cell of the UE is used for determining the second reference sequence. In one subembodiment, the identifier of the serving cell is a C-RNTI.

In one embodiment, the second reference sequence is cell-specific.

Specifically, according to one aspect of the present disclosure, comprising:
determining a third reference sequence;
herein elements in the third reference sequence and RSs of the first RS sequence transmitted in one of the K frequency domain sub-resource(s) have a one-to-one correspondence relationship.

In one embodiment, the third reference sequence is a pseudo random sequence. In one subembodiment, the pseudo random sequence is a part of a Gold sequence.

In one embodiment, an identifier of a serving cell of the UE is used for determining the third reference sequence. In one subembodiment, the identifier of the serving cell is a C-RNTI.

In one embodiment, the third reference sequence is cell-specific.

In one embodiment, the third reference sequence has a same length as RSs of the first RS sequence transmitted in the K frequency domain sub-resource(s).

Specifically, according to one aspect of the present disclosure, comprising:
transmitting downlink information;
herein the downlink information is used for determining the first frequency domain resource.

Specifically, according to one aspect of the present disclosure, comprising:
transmitting downlink information;
herein the downlink information is used for determining the position(s) of the K frequency domain sub-resource(s) in the first frequency domain resource.

Specifically, according to one aspect of the present disclosure, comprising:
receiving downlink information;
herein the downlink information is used for determining the first frequency domain resource and the position(s) of the K frequency domain sub-resource(s) in the first frequency domain resource. In one embodiment, the downlink information is System Information Block (SIB).

In one embodiment, the downlink information is carried by a higher-layer signaling.

In one embodiment, the downlink information is broadcast information.

The present disclosure provides a UE that support broadcast signals, comprising:
a first receiver, receiving a first radio signal on a first time-frequency resource;
herein the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource(s), K is a positive integer; (a) position(s) of the K frequency domain sub-resource(s) in the first frequency domain resource is(are) unfixed, RSs of the first RS sequence in a given frequency domain sub-resource are not related to a position of the given frequency domain sub-resource in the first frequency domain resource, the given frequency domain sub-resource is any one of the K frequency domain sub-resource(s); the K is equal to 1, an RS of the first RS sequence in a given sub-carrier is related to the given sub-carrier's position relative to the K frequency domain sub-resource, or an RS of the first RS sequence in a given sub-carrier is related to the given sub-carrier's position in the first frequency domain resource; the given sub-carrier is located within the first frequency domain resource and out of the K frequency domain sub-resource(s).

In one embodiment, the bandwidth of the K frequency domain sub-resource(s) is fixed.

In one embodiment, the K is greater than 1, the K frequency domain sub-resources have equal bandwidth.

Specifically, the UE that support broadcast signals, wherein the first receiver further determines a first reference sequence.

Herein the K is 1, the RS of the first RS sequence in the given sub-carrier is related to the given sub-carrier's position relative to the K frequency domain sub-resource. The first reference sequence is used for generating the first RS sequence. The first reference sequence has a same length as the first RS sequence. The first RS sequence is generated from the first reference sequence being cyclically shifted by t1 element(s), t1 is a positive integer.

In one embodiment, the t1 is related to the position of the K frequency domain sub-resource in the first frequency domain resource.

In one embodiment, the first reference sequence is a pseudo random sequence. In one subembodiment, the pseudo random sequence is a part of a Gold sequence.

In one embodiment, the first reference sequence is cell-specific.

Specifically, the above UE that support broadcast signals, wherein the first receiver further determines a second reference sequence.

herein an RS of the second reference sequence in the given sub-carrier is related to the given sub-carrier's position in the first frequency domain resource. The second reference sequence is used for generating the first RS sequence. The second reference sequence has a same length as the first RS sequence. RSs of the first RS sequence transmitted out of the K frequency domain sub-resource(s) are corresponding elements in the second reference sequence.

In one embodiment, the second reference sequence is a pseudo random sequence. In one subembodiment, the pseudo random sequence is a part of a Gold sequence.

In one embodiment, the second reference sequence is cell-specific.

Specifically, the above UE that supports broadcast signals, wherein the first receiver further determines a third reference sequence.

herein elements in the third reference sequence and RSs of the first RS sequence transmitted in one of the K frequency domain sub-resource(s) have a one-to-one correspondence relationship.

In one embodiment, the third reference sequence is a pseudo random sequence. In one subembodiment, the pseudo random sequence is a part of a Gold sequence.

In one embodiment, the third reference sequence is cell-specific.

Specifically, the above UE that supports broadcast signals, wherein the first receiver further receives downlink information.

herein the downlink information is used for determining the first frequency domain resource.

Specifically, the above UE that supports broadcast signals, wherein the first receiver further receives downlink information; wherein the downlink information is used for determining the position(s) of the K frequency domain sub-resource(s) in the first frequency domain resource.

Specifically, the above UE that supports broadcast signals, wherein the first receiver further receives downlink information; wherein the downlink information is used for determining the first frequency domain resource and the position(s) of the K frequency domain sub-resource(s) in the first frequency domain resource.

In one embodiment, the downlink information is broadcast information.

The present disclosure provides a base station device that supports broadcast signals, comprising:

a first transmitter, transmitting a first radio signal on a first time-frequency resource;

herein the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource(s), K is a positive integer; (a) position(s) of the K frequency domain sub-resource(s) in the first frequency domain resource is(are) unfixed, RSs of the first RS sequence in a given frequency domain sub-resource are not related to a position of the given frequency domain sub-resource in the first frequency domain resource, the given frequency domain sub-resource is any one of the K frequency domain sub-resource(s); the K is equal to 1, an RS of the first RS sequence in a given sub-carrier is related to the given sub-carrier's position relative to the K frequency domain sub-resource, or an RS of the first RS sequence in a given sub-carrier is related to the given sub-carrier's position in the first frequency domain resource; the given sub-carrier is located within the first frequency domain resource and out of the K frequency domain sub-resource(s).

Specifically, the above base station device that supports broadcast signals, wherein the first transmitter further determines a first reference sequence.

herein the K is 1, the RS of the first RS sequence in the given sub-carrier is related to the given sub-carrier's position relative to the K frequency domain sub-resource. The first reference sequence is used for generating the first RS sequence. The first reference sequence has a same length as the first RS sequence. The first RS sequence is generated from the first reference sequence being cyclically shifted by t1 element(s), t1 is a positive integer.

In one embodiment, the t1 is related to the position of the K frequency domain sub-resource in the first frequency domain resource.

Specifically, the above base station device that supports broadcast signals, wherein the first transmitter further determines a second reference sequence.

herein, an RS of the second reference sequence in the given sub-carrier is related to the given sub-carrier's position in the first frequency domain resource. The second reference sequence is used for generating the first RS sequence. The second reference sequence has a same length as the first RS sequence. RSs of the first RS sequence transmitted out of the K frequency domain sub-resource(s) are corresponding elements in the second reference sequence.

Specifically, the above base station device that supports broadcast signals, wherein the first transmitter further determines a third reference sequence.

herein elements in the third reference sequence and RSs of the first RS sequence transmitted in one of the K frequency domain sub-resource(s) have a one-to-one correspondence relationship.

Specifically, the above base station device that supports broadcast signals, wherein the first transmitter further transmits downlink information.

Herein the downlink information is used for determining the first frequency domain resource.

Specifically, the above base station device that supports broadcast signals, wherein the first transmitter further transmits downlink information; wherein the downlink information is used for determining the position(s) of the K frequency domain sub-resource(s) in the first frequency domain resource.

Specifically, the above base station device that supports broadcast signals, wherein the first transmitter further transmits downlink information; wherein the downlink information is used for determining the first frequency domain resource and the position(s) of the K frequency domain sub-resource(s) in the first frequency domain resource.

In one embodiment, the downlink information is broadcast information.

The present disclosure has the following advantages over the conventional scheme:

Under the circumstance that a UE receives system information through monitoring different frequency domain resources, the UE is able to correctly receive RSs on the frequency domain resource being monitored and use the RSs for channel estimation without needing to know the position of the frequency domain resource being monitored in the entire system bandwidth.

After a UE correctly receives system information, the UE can acquire from downlink information the position of frequency domain resources occupied by system information in the entire system bandwidth, and with this information, the UE can acquire RS sequences on the entire system bandwidth so as to utilize part of or the entire broadband RSs to perform more accurate channel estimation.

BRIEF DESCRIPTION OF THE DRAWINGS

Other features, objects and advantages of the present disclosure will become more apparent from the detailed description of non-restrictive embodiments taken in conjunction with the following drawings.

EMBODIMENT 1

Figure 1:
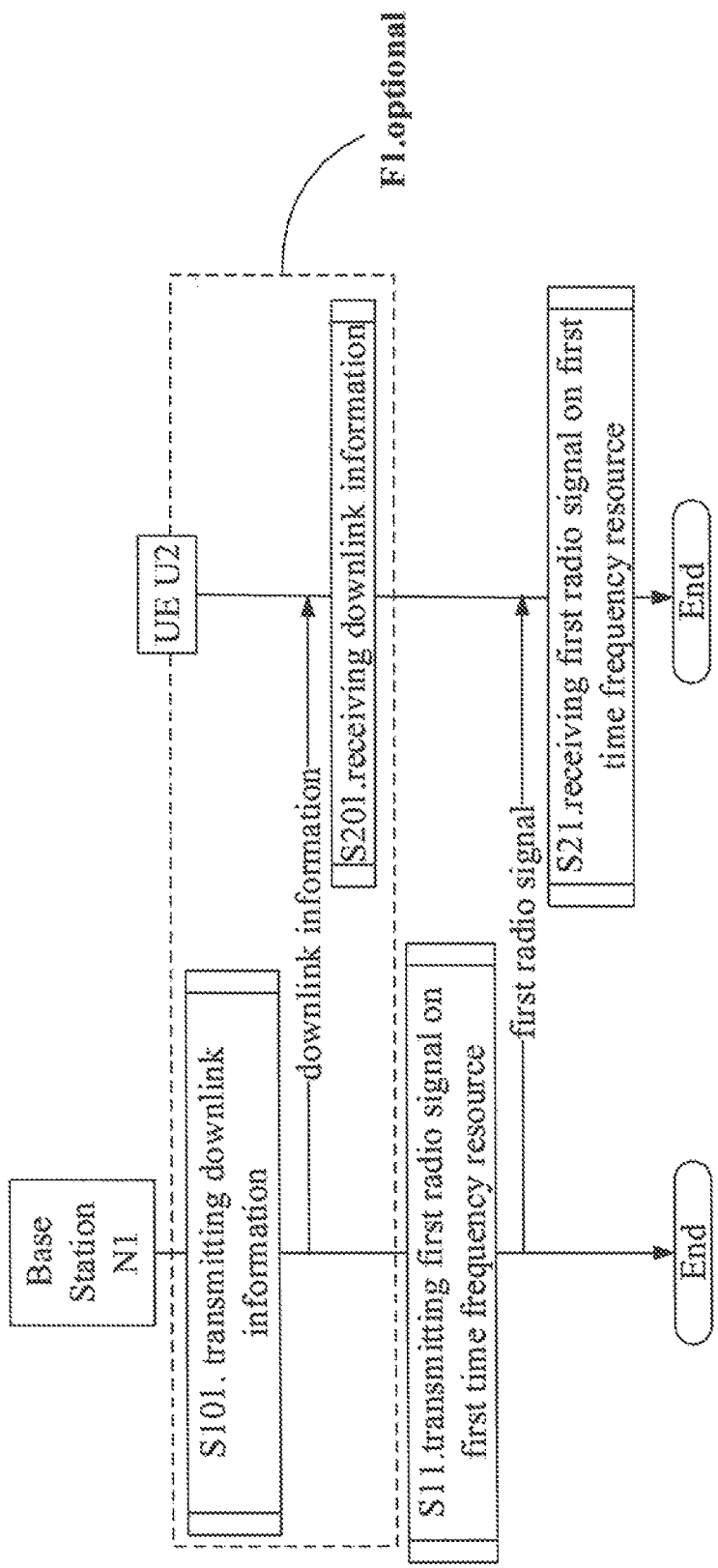
FIG. 1 illustrates a flow chart of wireless transmission according to one embodiment of the present disclosure.

Embodiment 1 illustrates a flow chart of wireless transmission, as shown in FIG. 1. In FIG. 1, a base station N1 is a maintenance base station of a serving cell of a UE U2. In FIG. 1, the step in block F1 of the figure is optional.

The base station N1 transmits downlink information in step S101; and transmits a first radio signal on a first time-frequency resource in step S11.

The UE U2 receives downlink information in step S201; and receives a first radio signal on a first time-frequency resource in step S21.

Herein, the first radio signal comprises part or all of a first RS sequence, RSs in the first RS sequence are mapped in sequence from lower frequency to higher frequency in frequency domain, the first time-frequency resource belongs to a first frequency domain resource in frequency domain. The first frequency domain resource comprises K frequency domain sub-resource(s), K is a positive integer. (A) Position(s) of the K frequency domain sub-resource(s) in the first frequency domain resource is(are) unfixed, RSs of the first RS sequence in a given frequency domain sub-resource are not related to a position of the given frequency domain sub-resource in the first frequency domain resource, the given frequency domain sub-resource is any one of the K frequency domain sub-resource(s). The K is equal to 1, an RS of the first RS sequence in a given sub-carrier is related to the given sub-carrier's position relative to the K frequency domain sub-resource; or an RS of the first RS sequence in a given sub-carrier is related to the given sub-carrier's position in the first frequency domain resource. The given sub-carrier is located within the first frequency domain resource and out of the K frequency domain sub-resource(s). The downlink information is used by the UE U2 for determining at least one of {the first frequency domain resource, the position(s) of the K frequency domain sub-resource(s) in the first frequency domain resource}.

In one embodiment, the bandwidth of the K frequency domain sub-resource(s) is fixed.

In one embodiment, the K is greater than 1, the K frequency domain sub-resources have equal bandwidth.

In one embodiment, the K frequency domain sub-resources are mutually orthogonal.

In one embodiment, the first frequency domain resource occupies the entire system bandwidth.

In one embodiment, the K frequency domain sub-resource(s) is(are) narrow banded.

In one embodiment, the downlink information is System Information Block (SIB).

In one embodiment, the downlink information is carried by a higher-layer signaling.

In one embodiment, the downlink information is broadcast information.

EMBODIMENT 2

Figure 2:
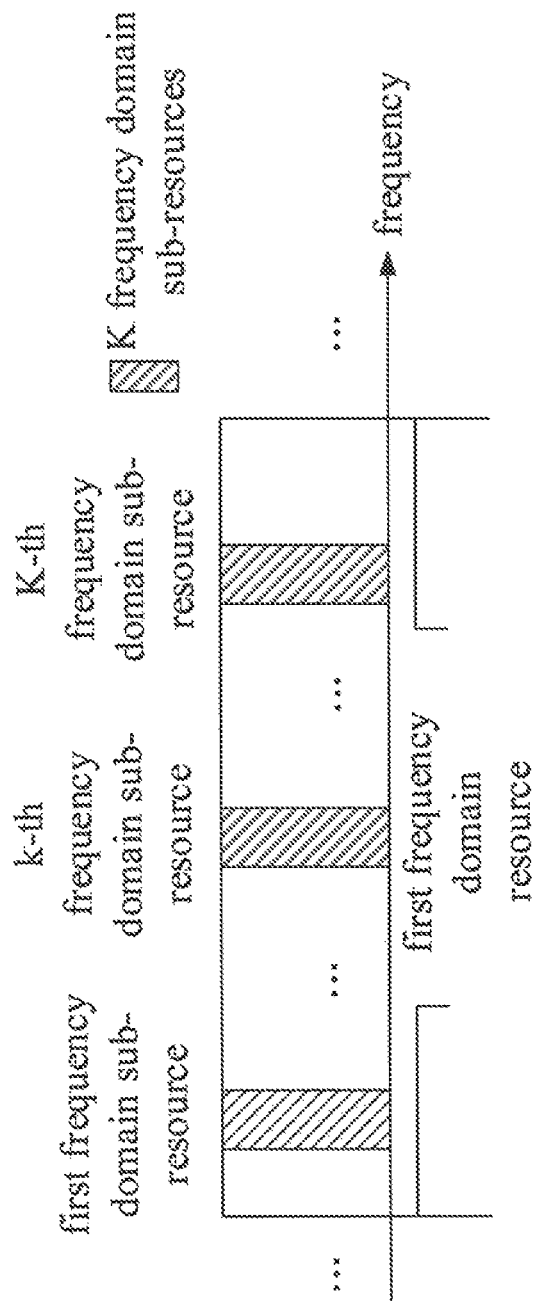
FIG. 2 illustrates a schematic diagram of the mapping of K frequency domain sub-resource(s) in a first frequency domain resource according to one embodiment of the present disclosure.

Embodiment 2 illustrates a schematic diagram of the mapping of K frequency domain sub-resource(s) in a first frequency domain resource, as shown in FIG. 2.

In embodiment 2, the first frequency domain resource comprises K frequency domain sub-resource(s), the K is a positive integer, the position(s) of the K frequency domain sub-resource(s) in the first frequency domain resource is(are) unfixed. In FIG. 2, k is a positive integer greater than 1 and less than the K.

In one embodiment, the bandwidth of the K frequency domain sub-resource(s) is fixed.

In one embodiment, the K is greater than 1, the K frequency domain sub-resources have equal bandwidth.

In one embodiment, the K frequency domain sub-resources are mutually orthogonal.

In one embodiment, the first frequency domain resource occupies the entire system bandwidth.

In one embodiment, the K frequency domain sub-resource(s) is(are) narrow banded.

In one embodiment, the K is equal to 1.

In one embodiment, the K is greater than 1.

EMBODIMENT 3

Figure 3:
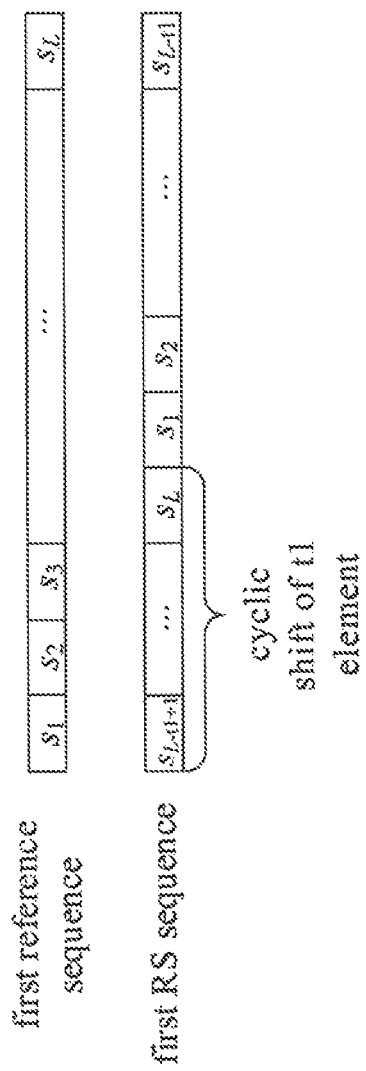
FIG. 3 illustrates a schematic diagram of the relationship between a first RS sequence and a first reference sequence according to one embodiment of the present disclosure.

Embodiment 3 illustrates a schematic diagram of the relationship between a first RS sequence and a first reference sequence, as shown in FIG. 3.

In Embodiment 3, the K in the present disclosure is equal to 1, an RS of the first RS sequence in a given sub-carrier is related to the given sub-carrier's position relative to the K frequency domain sub-resource in the present disclosure, the given sub-carrier is located within the first frequency domain resource and out of the K frequency domain sub-resource. The first reference sequence is used for generating the first RS sequence. The first reference sequence has the same length as the first RS sequence. The first RS sequence is generated from the first reference sequence being cyclically shifted by t1 element(s), the t1 is a positive integer. In FIG. 3, the length of the first RS sequence is denoted by L.

In one embodiment, the t1 is related to the position of the K frequency domain sub-resource in the first frequency domain resource.

In one embodiment, the first RS sequence is generated from the first reference sequence being cyclically shifted by t1 element(s) to the right, the t1 is an index of a target RS in the first RS sequence, the target RS is an RS corresponding to lowest frequency in RSs of the first RS sequence transmitted on the K frequency domain sub-resource.

In one embodiment, the first RS sequence is generated from the first reference sequence being cyclically shifted by t1 element(s) to the right, the t1 is an index of a target RS in the first RS sequence, the target RS is an RS corresponding to highest frequency in RSs of the first RS sequence transmitted on the K frequency domain sub-resource.

In one embodiment, the first reference sequence is a pseudo random sequence. In one subembodiment, the pseudo random sequence is a part of a Gold sequence.

In one embodiment, an identifier of a serving cell of the UE is used for determining the first reference sequence. In one subembodiment, the identifier of the serving cell is a C-RNTI.

In one embodiment, the first reference sequence is cell-specific.

EMBODIMENT 4

Figure 4:
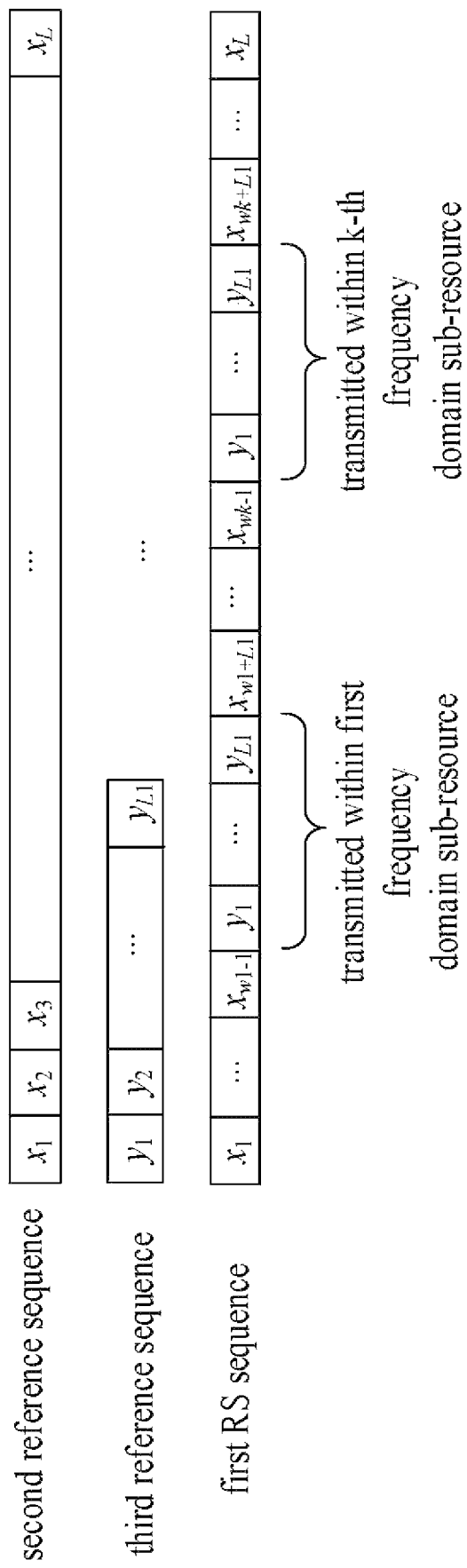
FIG. 4 illustrates a schematic diagram of the relationship between a first RS sequence and {a second reference sequence, a third reference sequence} according to one embodiment of the present disclosure.

Embodiment 4 illustrates a schematic diagram of the relationship between a first RS sequence and {a second reference sequence, a third reference sequence}, as shown in FIG. 4.

In Embodiment 4, an RS of the first RS sequence in a given sub-carrier is related to the given sub-carrier's position in the first frequency domain resource. The given sub-carrier is located within the first frequency domain resource and out of the K frequency domain sub-resource(s) in the present disclosure. An RS of the second reference sequence in the given sub-carrier is related to the given sub-carrier's position in the first frequency domain resource. The second reference sequence is used for generating the first RS sequence. The second reference sequence has a same length as the first RS sequence. RSs of the first RS sequence transmitted out of the K frequency domain sub-resource(s) are corresponding elements in the second reference sequence. Elements in the third reference sequence and RSs of the first RS sequence transmitted in one of the K frequency domain sub-resource(s) have a one-to-one correspondence relationship. In FIG. 4, the length of the first RS sequence is denoted by L, the length of the third reference sequence is denoted by L1, wk represents an index of a k-th given RS in the first RS sequence, the k-th given RS is an RS corresponding to lowest frequency in RSs of the first RS sequence transmitted on a k-th frequency domain sub-resource of the K frequency domain sub-resources, the k is a positive integer greater than 1 and not greater than the K.

In one embodiment, the second frequency sequence is a pseudo random sequence. In one subembodiment, the pseudo random sequence is a part of a Gold sequence.

In one embodiment, an identifier of a serving cell of the UE in the present disclosure is used for determining the second reference sequence. In one subembodiment of the above embodiment, the identifier of the serving cell is a C-RNTI.

In one embodiment, the second reference sequence is cell-specific.

In one embodiment, the third reference sequence is a pseudo random sequence. In one subembodiment of the above embodiment, the pseudo random sequence is a part of a Gold sequence.

In one embodiment, an identifier of a serving cell of the UE is used for determining the third reference sequence. In one subembodiment of the above embodiment, the identifier of the serving cell is a C-RNTI.

In one embodiment, the third reference sequence is cell-specific.

In one embodiment, the third reference sequence has a same length as RSs of the first RS sequence transmitted in the K frequency domain sub-resource(s).

EMBODIMENT 5

Figure 5:
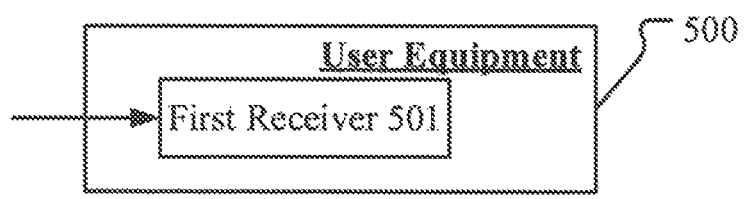
FIG. 5 illustrates a block diagram illustrating the structure of processing device for UE according to one embodiment of the present disclosure.

Embodiment 5 illustrates a block diagram illustrating the structure of a processing device for UE, as shown in FIG. 5. In FIG. 5, a processing device 500 in UE mainly comprises a first receiver 501.

In Embodiment 5, the first receiver 501 receives a first radio signal on a first time-frequency resource.

In Embodiment 5, the first radio signal comprises part or all of a first RS sequence, RSs in the first RS sequence are mapped in sequence from lower frequency to higher frequency in frequency domain, the first time-frequency resource belongs to a first frequency domain resource in frequency domain. The first frequency domain resource comprises K frequency domain sub-resource(s), K is a positive integer. (A) Position(s) of the K frequency domain sub-resource(s) in the first frequency domain resource is(are) unfixed, RSs of the first RS sequence in a given frequency domain sub-resource are not related to a position of the given frequency domain sub-resource in the first frequency domain resource, the given frequency domain sub-resource is any one of the K frequency domain sub-resource(s). The K is equal to 1, an RS of the first RS sequence in a given sub-carrier is related to the given sub-carrier's position relative to the K frequency domain sub-resource; or an RS of the first RS sequence in a given sub-carrier is related to the given sub-carrier's position in the first frequency domain resource. The given sub-carrier is located within the first frequency domain resource and out of the K frequency domain sub-resource(s).

In one embodiment, the first receiver 501 further determines a first reference sequence. Herein, the K is 1, the RS of the first RS sequence in the given sub-carrier is related to the given sub-carrier's position relative to the K frequency domain sub-resource. The first reference sequence is used by the first receiver 501 for generating the first RS sequence. The first reference sequence has a same length as the first RS sequence. The first RS sequence is generated from the first reference sequence being cyclically shifted by t1 element(s), t1 is a positive integer;

In one embodiment, the first receiver 501 further determines a second reference sequence. Herein, an RS of the second reference sequence in the given sub-carrier is related to the given sub-carrier's position in the first frequency domain resource. The second reference sequence is used by the first receiver 501 for generating the first RS sequence. The second reference sequence has a same length as the first RS sequence. RSs of the first RS sequence transmitted out of the K frequency domain sub-resource(s) are corresponding elements in the second reference sequence.

In one embodiment, the first receiver 501 further determines a third reference sequence. Herein, elements in the third reference sequence and RSs of the first RS sequence transmitted in one of the K frequency domain sub-resource(s) have a one-to-one correspondence relationship.

In one embodiment, the first receiver 501 further receives downlink information. Herein, the downlink information is used by the first receiver 501 for determining the first frequency domain resource.

In one embodiment, the first receiver 501 further receives downlink information. Herein, the downlink information is used for determining the position(s) of the K frequency domain sub-resource(s) in the first frequency domain resource.

In one embodiment, the first receiver 501 further receives downlink information. Herein, the downlink information is used for determining the first frequency domain resource and the position(s) of the K frequency domain sub-resource(s) in the first frequency domain resource.

EMBODIMENT 6

Figure 6:
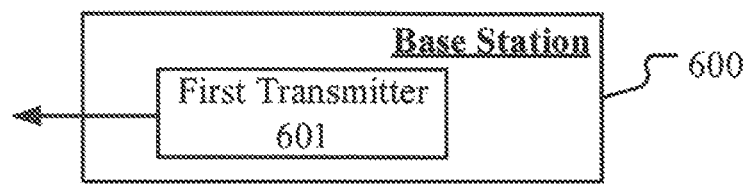
FIG. 6 illustrates a block diagram illustrating the structure of processing device for base station device according to one embodiment of the present disclosure.

Embodiment 6 illustrates a block diagram illustrating the structure of a processing device for a base station device, as shown in FIG. 6. In FIG. 6, a base station device 600 mainly comprises a first transmitter 601.

In Embodiment 6, a first transmitter 601 transmits a first radio signal on a first time-frequency resource.

In embodiment 6, the first radio signal comprises part or all of a first RS sequence, RSs in the first RS sequence are mapped in sequence from lower frequency to higher frequency in frequency domain, the first time-frequency resource belongs to a first frequency domain resource in frequency domain. The first frequency domain resource comprises K frequency domain sub-resource(s), K is a positive integer. (A) Position(s) of the K frequency domain sub-resource(s) in the first frequency domain resource is(are) unfixed, RSs of the first RS sequence in a given frequency domain sub-resource are not related to a position of the given frequency domain sub-resource in the first frequency domain resource, the given frequency domain sub-resource is any one of the K frequency domain sub-resource(s). The K is equal to 1, an RS of the first RS sequence in a given sub-carrier is related to the given sub-carrier's position relative to the K frequency domain sub-resource; or an RS of the first RS sequence in a given sub-carrier is related to the given sub-carrier's position in the first frequency domain resource. The given sub-carrier is located within the first frequency domain resource and out of the K frequency domain sub-resource(s).

In one embodiment, the first transmitter 601 further determines a first reference sequence. Herein, the K is 1, the RS of the first RS sequence in the given sub-carrier is related to the given sub-carrier's position relative to the K frequency domain sub-resource. The first reference sequence is used by the first transmitter 601 for generating the first RS sequence. The first reference sequence has a same length as the first RS sequence. The first RS sequence is generated from the first reference sequence being cyclically shifted by t1 element(s), t1 is a positive integer.

In one embodiment, the first transmitter 601 further determines a second reference sequence. Herein, an RS of the second reference sequence in the given sub-carrier is related to the given sub-carrier's position in the first frequency domain resource. The second reference sequence is used by the first transmitter 601 for generating the first RS sequence. The second reference sequence has a same length as the first RS sequence. RSs of the first RS sequence transmitted out of the K frequency domain sub-resource(s) are corresponding elements in the second reference sequence.

In one embodiment, the first transmitter 601 further determines a third reference sequence. Herein, elements in the third reference sequence and RSs of the first RS sequence transmitted in one of the K frequency domain sub-resource(s) have a one-to-one correspondence relationship.

In one embodiment, the first transmitter 601 further transmits downlink information. Herein, the downlink information is used for determining the first frequency domain resource.

In one embodiment, the first transmitter 601 further transmits downlink information. Herein, the downlink information is used for determining the position(s) of the K frequency domain sub-resource(s) in the first frequency domain resource.

In one embodiment, the first transmitter 601 further transmits downlink information. Herein, the downlink information is used for determining the first frequency domain resource and the position(s) of the K frequency domain sub-resource(s) in the first frequency domain resource.

EMBODIMENT 7

Figure 7:
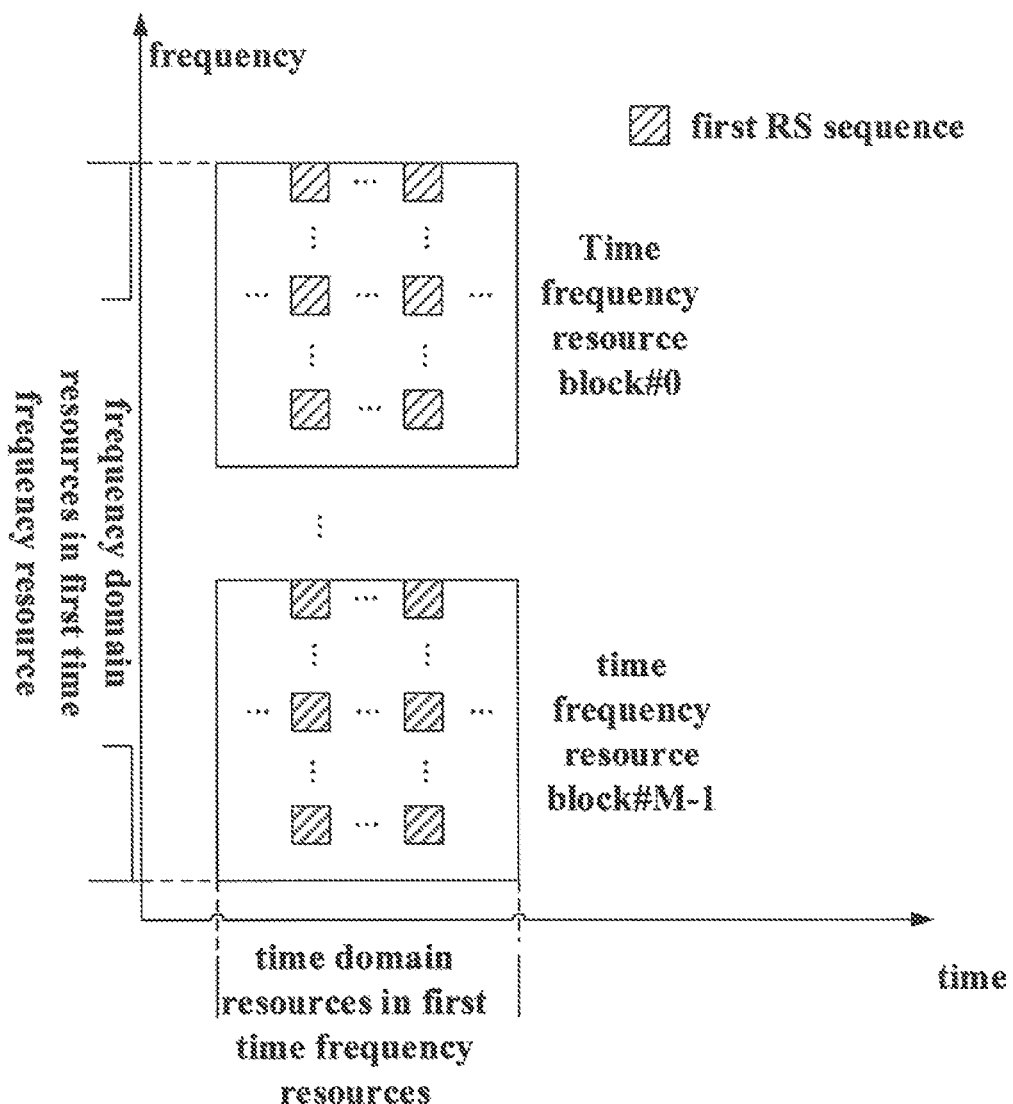
FIG. 7 illustrates a schematic diagram of the mapping of a first RS sequence in time-frequency domain resource according to one embodiment of the present disclosure.

Embodiment 7 illustrates a schematic diagram of the mapping of a first RS sequence in time-frequency domain resource, as shown in FIG. 7.

In FIG. 7, RSs in the first RS sequence are mapped in sequence from lower frequency to higher frequency in frequency domain. Patterns of the first RS sequence in all time-frequency resource blocks in the first time-frequency resource are the same, as shown in FIG. 7. All RSs of the first RS sequence are located within the first time-frequency resource.

In FIG. 7, the first time-frequency resource comprises M time-frequency resource blocks, indexes of the M time-frequency resource blocks are # {0, . . . , M−1}, respectively.

In one embodiment, the time-frequency resource blocks are Physical Resource Block Pairs (PRBPs).

In one embodiment, each of the time-frequency resource blocks occupies a positive integer number of sub-carriers in frequency domain, and occupies a positive integer number of multi-carrier symbols.

In one embodiment, the multi-carrier symbols are Orthogonal Frequency Division Multiplexing (OFDM) symbols.

In one embodiment, the multi-carrier symbols are Filter Bank Multi Carrier (FBMC) symbols.

In one embodiment, the multi-carrier symbols are Discrete Fourier Transform Spread OFDM (DFT-S-OFDM) symbols.

In one embodiment, patterns of the first RS sequence in time-frequency resource blocks are patterns of CSI-RS in time-frequency resource blocks.

In one embodiment, patterns of the first RS sequence in time-frequency resource blocks are patterns of DMRS in time-frequency resource blocks.

In one embodiment, all RSs of the first RS sequence are transmitted on one same physical layer channel.

In one embodiment, all RSs of the first RS sequence are transmitted by one same antenna port.

EMBODIMENT 8

Figure 8:
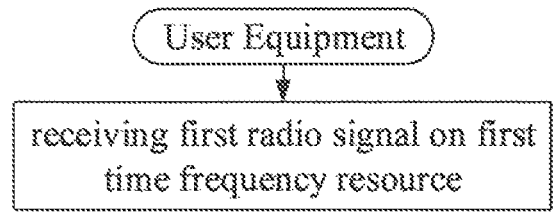
FIG. 8 illustrates a flow chart of a first radio signal according to one embodiment of the present disclosure.

Embodiment 8 illustrates a flow chart of a first radio signal, as shown in FIG. 8.

In Embodiment 8, the UE in the present disclosure receives a first radio signal on a first time-frequency resource. Herein, the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource(s), K is a positive integer; (a) position(s) of the K frequency domain sub-resource(s) in the first frequency domain resource is(are) unfixed, RSs of the first RS sequence in a given frequency domain sub-resource are not related to the position of the given frequency domain sub-resource in the first frequency domain resource, the given frequency domain sub-resource is any one of the K frequency domain sub-resource(s); the K is equal to 1, an RS of the first RS sequence in a given sub-carrier is related to the given sub-carrier's position relative to the K frequency domain sub-resource, or an RS of the first RS sequence in a given sub-carrier is related to the given sub-carrier's position in the first frequency domain resource; the given sub-carrier is located within the first frequency domain resource and out of the K frequency domain sub-resource(s).

In one embodiment, the bandwidth of the K frequency domain sub-resource(s) is fixed.

In one embodiment, the K is greater than 1, the K frequency domain sub-resources have equal bandwidth.

In one embodiment, the K frequency domain sub-resources are mutually orthogonal.

In one embodiment, the first frequency domain resource occupies the entire system bandwidth.

In one embodiment, the K frequency domain sub-resource(s) is(are) narrow banded.

In one embodiment, all RSs of the first RS sequence are transmitted by one same antenna port.

In one embodiment, patterns of the first RS sequence in all time-frequency resource blocks in the first time-frequency resource are the same.

In one embodiment, the time-frequency resource blocks are PRBPs.

In one embodiment, each of the time-frequency resource blocks occupies a positive integer number of sub-carriers in frequency domain, and occupy a positive integer number of multi-carrier symbols.

In one embodiment, the multi-carrier symbols are OFDM symbol(s).

In one embodiment, the multi-carrier symbols are FBMC symbol(s).

In one embodiment, the multi-carrier symbols are DFT-S-OFDM symbol(s).

In one embodiment, patterns of the first RS sequence in time-frequency resource blocks are patterns of CSI-RS in time-frequency resource blocks.

In one embodiment, patterns of the first RS sequence in time-frequency resource blocks are patterns of DMRS in time-frequency resource blocks.

In one embodiment, all RSs of the first RS sequence are transmitted on one same physical layer channel.

In one embodiment, the UE performs blind detection on a candidate frequency domain sub-resource to judge whether the candidate frequency domain sub-resource belongs to the K frequency domain sub-resource(s).

In one embodiment, the bandwidth of the candidate frequency domain sub-resource is equal to that of any of the K frequency domain sub-resource(s).

In one embodiment, the candidate frequency domain sub-resource belongs to the first frequency domain resource.

In one embodiment, the blind detection refers to: the UE performs coherent reception and energy detection over radio signals received on the candidate frequency domain sub-resource using RSs of the first RS sequence in the K frequency domain sub-resource(s). If a result of the energy detection is greater than a given threshold, the UE determines that the candidate frequency domain sub-resource belongs to the K frequency domain sub-resource(s); otherwise the UE determines that the candidate frequency domain sub-resource does not belong to the K frequency domain sub-resource(s).

EMBODIMENT 9

Figure 9:
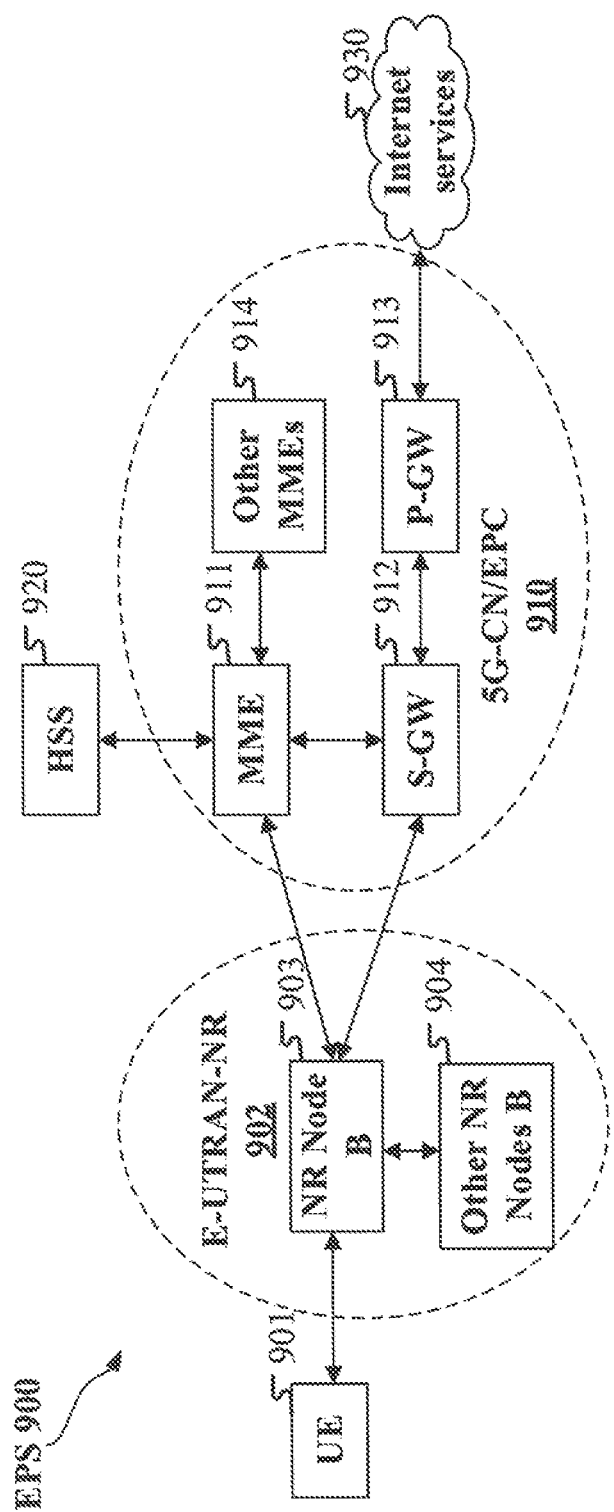
FIG. 9 illustrates a schematic diagram of a network architecture according to one embodiment of the present disclosure.

Embodiment 9 illustrates a schematic diagram of a network architecture, as shown in FIG. 9.

FIG. 9 illustrates a system network architecture 900 of Long-Term Evolution (LTE), Long-Term Evolution Advanced (LTE-A) and NR 5G systems. The LTE, LTE-A and NR 5G network architecture 900 may be called an Evolved Packet System (EPS) 900. EPS 900 may comprise one or more UEs 901, an E-UTRAN-NR 902, a 5G-Core Network/Evolved Packet Core (5G-CN/EPC) 910, a Home Subscriber Server (HSS) 920 and an Internet service 930. Herein, UMTS refers to Universal Mobile Telecommunications System. EPS may be interconnected with other access networks. For simple descriptions, these entities/interfaces are not shown. In FIG. 9, the EPS provides packet switching services. Those skilled in the art will easily understand that various concepts presented throughout the present disclosure can be extended to networks providing circuit switching services. The E-UTRAN-NR comprises an NR node B (gNB) 903 and other gNBs 904. gNB 903 provides UE 901 oriented user plane and control plane protocol terminations. gNB 903 may be connected to other gNBs 904 via X2 interface (for example, backhaul). The gNB 903 may be called a base station, a base transceiver station, a radio base station, a radio transceiver, a transceiver function, a Basic Service Set (BSS), an Extended Service Set (ESS), a TRP or other appropriate terms. The gNB 903 provides an access point of 5G-CN/EPC 910 for the UE 901. Examples of UE 901 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, game consoles, unmanned aerial vehicles, air vehicles, narrowband physical network equipment, machine-type communication equipment, land vehicles, automobiles, wearable equipment, or any other devices with similar functions. Those skilled in the art also can call the UE 901 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 903 is connected to the 5G-CN/EPC 910 via an S1 interface. The 5G-CN/EPC 910 comprises an MME 911, other MMEs 914, a Service Gateway (S-GW) 912 and a Packet Date Network Gateway (P-GW) 913. The MME 911 is a control node for processing a signaling between the UE 901 and the 5G-CN/EPC 910. Generally, the MME 911 provides bearer and connection management. All user Internet Protocol (IP) packets are transmitted through the S-GW 912. The S-GW 912 is connected to P-GW 913. The P-GW 913 provides UE IP address allocation and other functions. The P-GW 913 is connected to the Internet Service 930. The Internet Service 930 comprises IP services corresponding to operators, specifically including Internet, Intranet, IP Multimedia Subsystem (IMS) and Packet Switching Streaming Services (PPSs).

In one embodiment, the UE 901 corresponds to the UE in the present disclosure.

In one embodiment, the gNB 903 corresponds to the base station in the present disclosure.

EMBODIMENT 10

Figure 10:
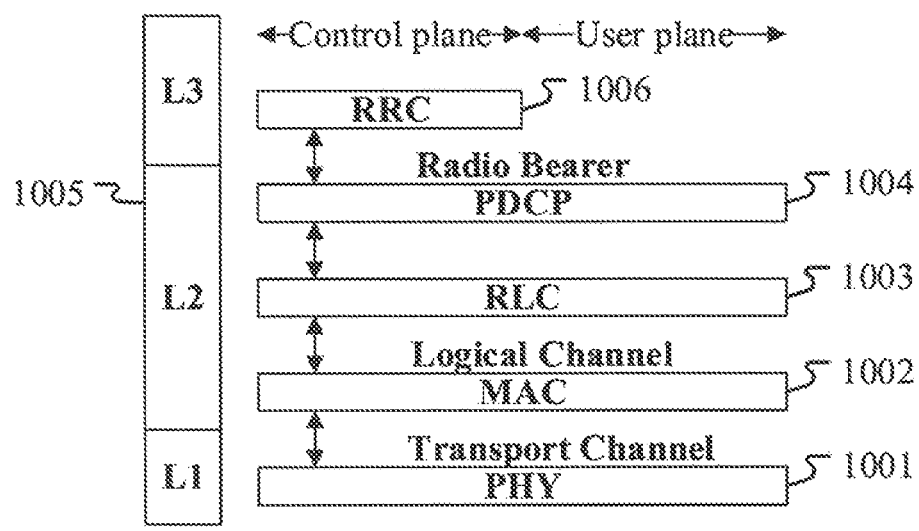
FIG. 10 illustrates a schematic diagram of a radio protocol architecture of a user plane and a control plane according to one embodiment of the present disclosure.

Embodiment 10 illustrates a radio protocol architecture of a user plane and a control plane, as shown in FIG. 10.

FIG. 10 is a schematic diagram illustrating an embodiment of a radio protocol architecture of a user plane and a control plane, as shown in FIG. 10. In FIG. 10, the radio protocol architecture of a UE and a gNB is represented by three layers, which are layer 1, layer 2 and layer 3, respectively. The layer 1 (L1) is the lowest layer and performs signal processing functions of each PHY layer. The L1 is called PHY 1001 in this paper. The layer 2 (L2) is above the PHY 1001, and is in charge of the link between the UE and the gNB via the PHY 1001. In the user plane, the L2 1005 comprises a Medium Access Control (MAC) sublayer 1002, a Radio Link Control (RLC) sublayer 1003 and a Packet Data Convergence Protocol (PDCP) sublayer 1004. All the three sublayers terminate at the gNB of the network side. Although not described in FIG. 10, the UE may comprise several protocol layers above L2 1005, such as a network layer (i.e. IP layer) terminated at the P-GW 913 of the network side and an application layer (i.e. a peer UE, a server, etc.). The PDCP sublayer 1004 also provides a header compression for a higher-layer packet so as to reduce a radio transmission overhead. The PDCP sublayer 1004 provides security by encrypting a packet and provides support for UE handover between gNBs. The RLC sublayer 1003 provides segmentation and reassembling of a higher-layer packet, retransmission of a lost packet, and reordering of a lost packet so as to compensate the disordered reception of caused by HARQ. The MAC sublayer 1002 is also responsible for allocating between UEs various radio resources (i.e. resource blocks) in a cell. The MAC sublayer 1002 is also in charge of HARQ operation. In the control plane, the radio protocol architecture of the UE and the gNB is almost the same as the radio architecture in the user plane on the PHY 1001 and the L2 1005, but there is no header compression for the control plane. The control plane also comprises a Radio Resource Control (RRC) sublayer 1006 in the layer 3 (L3). The RRC sublayer 1006 is responsible for acquiring radio resources (i.e. radio bearer) and configuring the lower layers using an RRC signaling between the gNB and the UE.

In one embodiment, the radio protocol architecture in FIG. 10 is applicable to the UE in the present disclosure.

In one embodiment, the radio protocol architecture in FIG. 10 is applicable to the base station device in the present disclosure.

In one embodiment, the first radio signal in the present disclosure is generated by the PHY 1001.

In one embodiment, the first RS sequence in the present disclosure is generated by the PHY 1001.

In one embodiment, the first reference sequence in the present disclosure is generated by the PHY 1001.

In one embodiment, the second reference sequence in the present disclosure is generated by the PHY 1001.

In one embodiment, the third reference sequence in the present disclosure is generated by the PHY 1001.

In one embodiment, the downlink information in the present disclosure is generated by the RRC sublayer 1006.

EMBODIMENT 11

Figure 11:
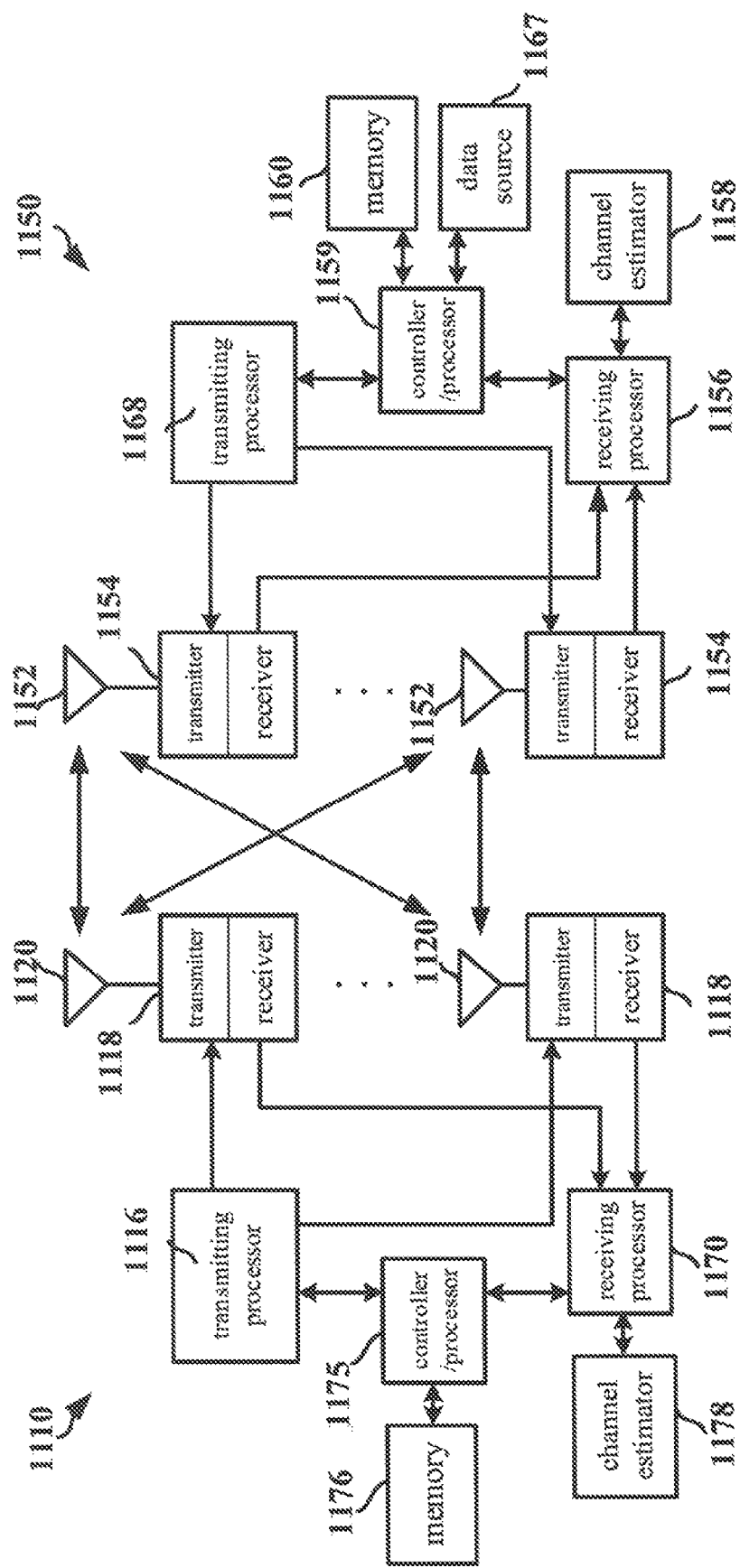
FIG. 11 illustrates a schematic diagram of an evolved node and a UE according to one embodiment of the present disclosure.

Embodiment 11 illustrates a schematic diagram of an evolved node and a UE, as shown in FIG. 11. FIG. 11 is a block diagram of a gNB 1110 in communication with a UE 1150 in an access network.

The gNB comprises a controller/processer 1175, a memory 1176, a receiving processor 1170, a transmitting processor 1116, a channel estimator 1178, a transmitter/receiver 1118 and antennas 1120.

The UE 1150 comprises a controller/processor 1159, a memory 1160, a data source 1167, a transmitting processor 1168, a receiving processor 1156, a channel estimator 1158, a transmitter/receiver 1154 and antennas 1152.

In downlink (DL) transmission, at the gNB 1110 side, a higher-layer packet coming from the core network is provided to the controller/processor 1175. The controller/processor 1175 provides functions of layer 2. In downlink transmission, the controller/processor 1175 provides header compression, encrypting, packet segmentation and reordering, multiplexing between a logical channel and a transport channel, and radio resource allocation for the UE 1150 based on various priorities. The controller/processor 1175 is also in charge of HARQ operation, retransmission of lost packets, and signaling to the UE 1150. The transmitting processor 1116 performs signal processing functions used for layer 1 (that is, PHY), including encoding and interleaving, so as to ensure a forward error correction (FEC) and the mapping to signal clusters corresponding to different modulation schemes (i.e., PBSK, QPSK, M-PSK, M-QAM) at the UE 1150 side. The encoded and modulated signals experience spatial precoding/beamforming in the transmitting processor 1116 to form one or more spatial streams. The transmitting processor 1116 maps each of the spatial streams into subcarriers, which will be multiplexed with reference signals (i.e. pilots) in time domain and/or frequency domain, and then processes the spatial stream via Inverse Fast Fourier Transform (IFFT) to generate a physical channel carrying time-domain multi-carrier symbol streams. Each transmitter 1118 converts baseband multi-carrier symbol streams provided by the transmitting processor 1116 into radio frequency streams, which are later provided to a corresponding antenna 1120.

In downlink transmission, at the UE 1150 side, each receiver 1154 receives signals via a corresponding antenna 1152. Each receiver 1154 recovers information modulated to the radio frequency carrier, and converts radio frequency streams into baseband multi-carrier symbol streams to be provided to the receiving processor 1156. The receiving processor 1156 and the channel estimator 1158 perform various signal processing functions of layer 1. The receiving processor 1156 converts baseband multi-carrier symbol streams from time-domain to frequency domain using FFT. In frequency domain, physical layer data signals and reference signals are demultiplexed by the receiving processor 1156, wherein the reference signals will be used in the channel estimator 1158 for channel estimation, physical layer data is used to recover any spatial stream targeting the UE 1150 in the receiving processor 1156 through multi-antenna detection. Symbols on each of the spatial streams are demodulated and recovered in the receiving processor 1156 to generate soft decisions. The soft decisions are then decoded and de-interleaved by the receiving processor 1156 so as to recover higher-layer data and control signals transmitted by the gNB 1110, the higher-layer data and control signals are then provided to the controller/processer 1159. The controller/processor 1159 performs functions of layer 2. The controller/processor 1159 can be connected to the memory 1160 that stores program codes and data. The memory 1160 is a computer readable medium. In downlink transmission, the controller/processor 1159 provides demultiplexing, packet reassembling, decrypting, header decompression and control signal processing between transport channels and logical channels so as to recover higher-layer packets coming from the core network. The higher-layer packets are then provided to all protocol layers above layer 2. Also, control signals can be provided to layer 3 for processing. The controller/processor 1159 is also responsible for performing error detection with ACK and/or NACK protocol to support the HARQ operation.

In uplink (UL) transmission, at the UE 1150 side, the data source 1167 provides higher-layer packets to the controller/processor 1159. The data source 1167 represents all protocol layers above layer 2. Similar to the transmission function at the gNB 1110 described in downlink transmission, the controller/processor 1159 performs header compression, encrypting, packet segmentation and reordering, and multiplexing between logical channels and transport channels based on radio resource allocation of gNB 1110, and performs layer 2 functions used for a user plane and a control plane. The controller/processor 1159 is also in charge of HARQ operation, retransmission of lost packets, and signaling to the gNB 1110. The transmitting processor 1168 selects an appropriate encoding and modulation scheme, and provides multi-antenna spatial precoding/beamforming. Spatial streams generated from multi-antenna spatial precoding/beamforming are modulated by the transmitting processor 1168 into multi-carrier/single-carrier symbol streams, and then are provided to different antennas 1152 via the transmitter 1154. Each transmitter 1154 first converts baseband symbol streams provided by the transmitting processor 1168 into radio frequency streams, and provides the radio frequency streams to a corresponding antenna 1152.

In uplink transmission, the function of the gNB 1110 side is similar to the receiving function of the UE 1150 side described in downlink transmission. Each receiver 1118 receives radio frequency signals via a corresponding antenna 1120, converts the received radio frequency signals into baseband signals, and then provides the baseband signals to the receiving processor 1170. The receiving processor 1170 and the channel estimator 1178 perform functions of layer 1, the controller/processor 1175 performs functions of layer 2. The controller/processor 1175 can be connected to the memory 1176 that stores program codes and data. The memory 1176 is a computer readable medium. In uplink transmission, the controller/processor 1175 provides demultiplexing, packet reassembling, decrypting, header decompression and control signal processing between transport channels and logical channels so as to recover higher-layer packets coming from the UE 1150. The higher-layer packets coming from the controller/processor 1175 can be provided to the core network. The controller/processor 1175 is also responsible for performing error detection with ACK and/or NACK protocol to support HARQ operation.

In one embodiment, the UE 1150 comprises: at least one processor and at least one memory. The at least one memory comprises computer program codes. The at least one memory and the computer program codes are configured to be used in collaboration with the at least one processor.

In one embodiment, the UE 1150 comprises: a memory that stores computer readable instruction program, the computer readable instruction program generates an action when executed by at least one processor. The action comprises: receiving the first radio signal in the present disclosure on the first time-frequency resource in the present disclosure, determining the first reference sequence in the present disclosure, determining the second sequence in the present disclosure, determining the third sequence in the present disclosure, generating the first RS sequence in the present disclosure, and receiving the downlink information in the present disclosure.

In one embodiment, the gNB 1110 comprises: at least one processor and at least one memory, the at least one memory comprises computer program codes; the at least one memory and the computer program codes are configured to be used in collaboration with the at least one processor.

In one embodiment, the gNB 1110 comprises: a type of memory that stores computer readable instruction program, the computer readable instruction program generates an action when executed by at least one processor, the action comprises: transmitting the first radio signal in the present disclosure on the first time-frequency resource in the present disclosure, determining the first reference sequence in the present disclosure, determining the second reference sequence in the present disclosure, determining the third reference sequence in the present disclosure, generating the first RS sequence in the present disclosure, and transmitting the downlink information in the present disclosure.

In one embodiment, the UE 1150 corresponds to the UE in the present disclosure.

In one embodiment, the UE gNB 1110 corresponds to the base station in the present disclosure.

In one embodiment, at least one of the antennas 1120, the transmitter 1118, the transmitting processor 1116 and the controller/processor 1175 is used for transmitting the first radio signal in the present disclosure, and at least one of the antennas 1152, the receiver 1154, the receiving processor 1156, the channel estimator 1158 and the controller/processor 1159 is used for receiving the first radio signal in the present disclosure.

In one embodiment, the transmitting processor 1116 is used for generating the first RS sequence in the present disclosure, at least one of the receiving processor 1156 and the channel estimator 1158 is used for generating the first RS sequence in the present disclosure.

In one embodiment, the transmitting processor 1116 is used for determining the first reference sequence in the present disclosure, at least one of the receiving processor 1156 and the channel estimator 1158 is used for determining the first reference sequence in the present disclosure.

In one embodiment, the transmitting processor 1116 is used for determining the second reference sequence in the present disclosure, at least one of the receiving processor 1156 and the channel estimator 1158 is used for determining the second reference sequence in the present disclosure.

In one embodiment, the transmitting processor 1116 is used for determining the third reference sequence in the present disclosure, at least one of the receiving processor 1156 and the channel estimator 1158 is used for determining the third reference sequence in the present disclosure.

In one embodiment, at least one of the antennas 1120, the transmitter 1118, the transmitting processor 1116 and the controller/processor 1175 is used for transmitting the downlink information in the present disclosure, at least one of the antennas 1152, the receiver 1154, the receiving processor 1156, the channel estimator 1158 and the controller/processor 1159 is used for receiving the downlink information in the present disclosure.

In one embodiment, the first receiver 501 in Embodiment 5 comprises at least one of the antennas 1152, the receiver 1154, the receiving processor 1156, the channel estimator 1158, the controller/processor 1159 and the memory 1160.

In one embodiment, the first transmitter 601 in Embodiment 6 comprises at least one of the antennas 1120, the transmitter 1118, the transmitting processor 1116, the controller/processor 1175 and the memory 1176.

The ordinary skill in the art may understand that all or part of steps in the above method may be implemented by instructing hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP) and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) that supports broadcast signals, comprising:
   receiving a first radio signal on a first time-frequency resource;
   wherein the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource; a position of the K frequency domain sub-resource in the first frequency domain resource is unfixed, RSs of the first RS sequence in a given frequency domain sub-resource are not related to a position of the given frequency domain sub-resource in the first frequency domain resource, the given frequency domain sub-resource is the K frequency domain sub-resource; the K is equal to 1, an RS of the first RS sequence in a given sub-carrier is related to the given sub-carrier's position in the first frequency domain resource; the given sub-carrier is located within the first frequency domain resource and out of the K frequency domain sub-resource.

2. The method according to claim 1, comprising:
   determining a first reference sequence,
   wherein the RS of the first RS sequence in the given sub-carrier is related to the given sub-carrier's position relative to the K frequency domain sub-resource; the first reference sequence is used for generating the first RS sequence, the first reference sequence has a same length as the first RS sequence, the first RS sequence is generated from the first reference sequence being cyclically shifted by at least one element;
   or,
   determining a second reference sequence,
   wherein an RS of the second reference sequence in the given sub-carrier is related to the given sub-carrier's position in the first frequency domain resource, the second reference sequence is used for generating the first RS sequence, the second reference sequence has a same length as the first RS sequence, RSs of the first RS sequence transmitted out of the K frequency domain sub-resource are corresponding elements in the second reference sequence, the second reference sequence is a pseudo random sequence;
   or,
   determining a second reference and a third reference sequence,
   wherein an RS of the second reference sequence in the given sub-carrier is related to the given sub-carrier's position in the first frequency domain resource, the second reference sequence is used for generating the first RS sequence, the second reference sequence has a same length as the first RS sequence, RSs of the first RS sequence transmitted out of the K frequency domain sub-resource are corresponding elements in the second reference sequence, elements in the third reference sequence and RSs of the first RS sequence transmitted in the K frequency domain sub-resource have a one-to-one correspondence relationship, the second reference sequence and the third reference sequence are pseudo random sequences.

3. The method according to claim 2, wherein an identifier of a serving cell of the UE is used for determining the first reference sequence; or, an identifier of a serving cell of the UE is used for determining the second reference sequence; or, an identifier of a serving cell of the UE is used for determining the second reference sequence and the third reference sequence.

4. The method according to claim 1, comprising:
receiving downlink information, the downlink information is system information block;
wherein the downlink information is used for determining the first frequency domain resource, or the downlink information is used for determining the position of the K frequency domain sub-resource in the first frequency domain resource, or the downlink information is used for determining the first frequency domain resource and the position of the K frequency domain sub-resource in the first frequency domain resource.

5. The method according to claim 1, wherein the first frequency domain resource occupies the entire system bandwidth.

6. A method in a Base Station that supports broadcast signals, comprising:
transmitting a first radio signal on a first time-frequency resource;
wherein the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource; a position of the K frequency domain sub-resource in the first frequency domain resource is unfixed, RSs of the first RS sequence in a given frequency domain sub-resource are not related to a position of the given frequency domain sub-resource in the first frequency domain resource, the given frequency domain sub-resource is the K frequency domain sub-resource; the K is equal to 1, an RS of the first RS sequence in a given sub-carrier is related to the given sub-carrier's position in the first frequency domain resource; the given sub-carrier is located within the first frequency domain resource and out of the K frequency domain sub-resource.

7. The method according to claim 6, comprising
determining a first reference sequence;
wherein the RS of the first RS sequence in the given sub-carrier is related to the given sub-carrier's position relative to the K frequency domain sub-resource; the first reference sequence is used for generating the first RS sequence, the first reference sequence has a same length as the first RS sequence, the first RS sequence is generated from the first reference sequence being cyclically shifted by at least one element;
or,
determining a second reference sequence,
wherein an RS of the second reference sequence in the given sub-carrier is related to the given sub-carrier's position in the first frequency domain resource, the second reference sequence is used for generating the first RS sequence, the second reference sequence has a same length as the first RS sequence, RSs of the first RS sequence transmitted out of the K frequency domain sub-resource are corresponding elements in the second reference sequence, the second reference sequence is a pseudo random sequence;
or,
determining a second reference sequence and determining a third reference sequence,
wherein an RS of the second reference sequence in the given sub-carrier is related to the given sub-carrier's position in the first frequency domain resource, the second reference sequence is used for generating the first RS sequence, the second reference sequence has a same length as the first RS sequence, RSs of the first RS sequence transmitted out of the K frequency domain sub-resource are corresponding elements in the second reference sequence, elements in the third reference sequence and RSs of the first RS sequence transmitted in the K frequency domain sub-resource have a one-to-one correspondence relationship, the second reference sequence and the third reference sequence are pseudo random sequences.

8. The method according to claim 7, wherein an identifier of a serving cell of a target receiver of the first radio signal is used for determining the first reference sequence; or, an identifier of a serving cell of a target receiver of the first radio signal is used for determining the second reference sequence; or, an identifier of a serving cell of a target receiver of the first radio signal is used for determining the second reference sequence and the third reference sequence.

9. The method according to claim 6, comprising:
transmitting downlink information, the downlink information is system information block;
wherein the downlink information is used for determining the first frequency domain resource, or the downlink information is used for determining the position of the K frequency domain sub-resource in the first frequency domain resource, or the downlink information is used for determining the first frequency domain resource and the position of the K frequency domain sub-resource in the first frequency domain resource.

10. The method according to claim 6, wherein the first frequency domain resource occupies the entire system bandwidth.

11. A User Equipment (UE) that supports broadcast signals, comprising:
a first receiver, receiving a first radio signal on a first time-frequency resource;
wherein the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource; a position of the K frequency domain sub-resource in the first frequency domain resource is unfixed, RSs of the first RS sequence in a given frequency domain sub-resource are not related to a position of the given frequency domain sub-resource in the first frequency domain resource, the given frequency domain sub-resource is the K frequency domain sub-resource; the K is equal to 1, an RS of the first RS sequence in a given sub-carrier is related to the given sub-carrier's position in the first frequency domain resource; the given sub-carrier is located within the first frequency domain resource and out of the K frequency domain sub-resource.

12. The UE according to claim 11, wherein the first receiver is used for determining a first reference sequence; wherein the RS of the first RS sequence in the given sub-carrier is related to the given sub-carrier's position relative to the K frequency domain sub-resource; the first reference sequence is used for generating the first RS sequence, the first reference sequence has a same length as the first RS sequence, the first RS sequence is generated from the first reference sequence being cyclically shifted by at least one element;
- or, the first receiver is used for determining a second reference sequence; wherein an RS of the second reference sequence in the given sub-carrier is related to the given sub-carrier's position in the first frequency domain resource; the second reference sequence is used for generating the first RS sequence; the second reference sequence has a same length as the first RS sequence, RSs of the first RS sequence transmitted out of the K frequency domain sub-resource are corresponding elements in the second reference sequence, the second reference sequence is a pseudo random sequence;
- or, the first receiver is used for determining a second reference sequence and a third reference sequence; wherein an RS of the second reference sequence in the given sub-carrier is related to the given sub-carrier's position in the first frequency domain resource; the second reference sequence is used for generating the first RS sequence; the second reference sequence has a same length as the first RS sequence, RSs of the first RS sequence transmitted out of the K frequency domain sub-resource are corresponding elements in the second reference sequence; elements in the third reference sequence and RSs of the first RS sequence transmitted in the K frequency domain sub-resource have a one-to-one correspondence relationship, the second reference sequence and the third reference sequence are pseudo random sequences.

13. The UE according to claim 12, wherein an identifier of a serving cell of the UE is used for determining the first reference sequence; or, an identifier of a serving cell of the UE is used for determining the second reference sequence; or, an identifier of a serving cell of the UE is used for determining the second reference sequence and the third reference sequence.

14. The UE according to claim 11, wherein the first receiver receives downlink information, the downlink information is system information block; wherein the downlink information is used for determining the first frequency domain resource, or the downlink information is used for determining the position of the K frequency domain sub-resource in the first frequency domain resource, or the downlink information is used for determining the first frequency domain resource and the position of the K frequency domain sub-resource in the first frequency domain resource.

15. The UE according to claim 11, wherein the first frequency domain resource occupies the entire system bandwidth.

16. A base station device that supports broadcast signals, comprising:
- a first transmitter, transmitting a first radio signal on a first time-frequency resource;
- wherein the first radio signal comprises part or all of a first RS sequence, RSs in the first RS sequence are mapped in sequence from lower frequency to higher frequency in frequency domain, the first time-frequency resource belongs to a first frequency domain resource in frequency domain; the first frequency domain resource comprises K frequency domain sub-resource; a position of the K frequency domain sub-resource in the first frequency domain resource is unfixed, RSs of the first RS sequence in a given frequency domain sub-resource are not related to a position of the given frequency domain sub-resource in the first frequency domain resource, the given frequency domain sub-resource is the K frequency domain sub-resource; the K is equal to 1, an RS of the first RS sequence in a given sub-carrier is related to the given sub-carrier's position in the first frequency domain resource; the given sub-carrier is located within the first frequency domain resource and out of the K frequency domain sub-resource.

17. The base station device according to claim 16, wherein the first transmitter determines a first reference sequence; wherein the RS of the first RS sequence in the given sub-carrier is related to the given sub-carrier's position relative to the K frequency domain sub-resource; the first reference sequence is used for generating the first RS sequence; the first reference sequence has a same length as the first RS sequence; the first RS sequence is generated from the first reference sequence being cyclically shifted by at least one element;
- or, the first transmitter determines a second reference sequence, wherein an RS of the second reference sequence in the given sub-carrier is related to the given sub-carrier's position in the first frequency domain resource, the second reference sequence is used for generating the first RS sequence, the second reference sequence has a same length as the first RS sequence, RSs of the first RS sequence transmitted out of the K frequency domain sub-resource are corresponding elements in the second reference sequence, the second reference sequence is a pseudo random sequence;
- or, the first transmitter determines a second reference sequence and a third reference sequence, wherein an RS of the second reference sequence in the given sub-carrier is related to the given sub-carrier's position in the first frequency domain resource, the second reference sequence is used for generating the first RS sequence, the second reference sequence has a same length as the first RS sequence, RSs of the first RS sequence transmitted out of the K frequency domain sub-resource are corresponding elements in the second reference sequence, elements in the third reference sequence and RSs of the first RS sequence transmitted in the K frequency domain sub-resource have a one-to-one correspondence relationship, the second reference sequence and the third reference sequence are pseudo random sequences.

18. The method according to claim 17, wherein an identifier of a serving cell of a target receiver of the first radio signal is used for determining the first reference sequence; or, an identifier of a serving cell of a target receiver of the first radio signal is used for determining the second reference sequence; or, an identifier of a serving cell of a target receiver of the first radio signal is used for determining the second reference sequence and the third reference sequence.

19. The base station device according to claim 16, wherein the first transmitter transmits downlink information, the downlink information is system information block; wherein the downlink information is used for determining the first frequency domain resource, or the downlink information is used for determining the position of the K frequency domain sub-resource in the first frequency domain resource, or the downlink information is used for determining the first frequency domain resource and the position of the K frequency domain sub-resource in the first frequency domain resource.

20. The base station device according to claim 16, wherein the first frequency domain resource occupies the entire system bandwidth.

* * * * *